US010224993B2

(12) United States Patent
Kim et al.

(10) Patent No.: US 10,224,993 B2
(45) Date of Patent: Mar. 5, 2019

(54) BEAMFORMING METHOD IN MULTI-ANTENNA WIRELESS COMMUNICATION SYSTEM AND APPARATUS FOR SAME

(71) Applicant: LG ELECTRONICS INC., Seoul (KR)

(72) Inventors: Youngtae Kim, Seoul (KR); Kijun Kim, Seoul (KR); Jonghyun Park, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/306,741

(22) PCT Filed: May 4, 2015

(86) PCT No.: PCT/KR2015/004475
§ 371 (c)(1),
(2) Date: Oct. 25, 2016

(87) PCT Pub. No.: WO2015/167316
PCT Pub. Date: Nov. 5, 2015

(65) Prior Publication Data
US 2017/0047977 A1    Feb. 16, 2017

Related U.S. Application Data

(60) Provisional application No. 61/987,502, filed on May 2, 2014.

(51) Int. Cl.
H04B 7/06    (2006.01)
H04B 7/10    (2017.01)

(52) U.S. Cl.
CPC ......... H04B 7/0617 (2013.01); H04B 7/0621 (2013.01); H04B 7/10 (2013.01)

(58) Field of Classification Search
CPC .. H04B 7/0456; H04B 7/0695; H04B 7/0617; H04B 7/0626; H04B 7/0621; H04B 7/0639; H04W 72/046
See application file for complete search history.

(56) References Cited

U.S. PATENT DOCUMENTS

2007/0249405 A1    10/2007  Goldberg
2013/0090128 A1*    4/2013  Sawamoto ............ H04W 24/02
                                                    455/452.2
(Continued)

FOREIGN PATENT DOCUMENTS

CN    103687010    3/2014
WO    2014008072    1/2014

OTHER PUBLICATIONS

Ming Fei and Pingzhi Fan,"Position-assisted fast handover schemes for LTE-advanced network under high mobility scenarios", Southwest Jiaotong University, China, JMT, Dec. 2012.*
(Continued)

Primary Examiner — Aristocratis Fotakis
(74) Attorney, Agent, or Firm — Lee Hong Degerman Kang Waimey

(57) ABSTRACT

The present invention relates to a method and an apparatus for beamforming by a base station in a wireless communication system supporting multiple antennas. Particularly, the method comprises the steps of: determining a first coverage on the basis of long-term feedback information; setting multiple logical antenna ports for the first coverage on the basis of a combination of multiple horizontal beams and multiple vertical beams; and transmitting a channel state information-reference signal to a terminal according to a precoding matrix index which is set on the basis of the multiple antenna ports, wherein the multiple horizontal beams respectively correspond to multiple second coverages divided into horizontal domains on the basis of the first (Continued)

coverage, and the multiple vertical beams respectively correspond to multiple third coverages divided into vertical domains on the basis of the first coverage.

17 Claims, 13 Drawing Sheets

(56) References Cited

U.S. PATENT DOCUMENTS

| | | | |
|---|---|---|---|
| 2013/0114763 A1* | 5/2013 | Park | H04B 7/0413 |
| | | | 375/296 |
| 2013/0235807 A1 | 9/2013 | Lee et al. | |
| 2013/0258964 A1* | 10/2013 | Nam | H04W 72/046 |
| | | | 370/329 |
| 2013/0308715 A1* | 11/2013 | Nam | H04B 7/0469 |
| | | | 375/267 |
| 2014/0011468 A1 | 1/2014 | Park et al. | |
| 2014/0226702 A1* | 8/2014 | Onggosanusi | H04B 7/0469 |
| | | | 375/219 |
| 2015/0043673 A1* | 2/2015 | Lee | H04B 7/0469 |
| | | | 375/267 |
| 2015/0222335 A1* | 8/2015 | Jing | H04B 7/0469 |
| | | | 375/267 |
| 2015/0222340 A1* | 8/2015 | Nagata | H04W 16/28 |
| | | | 375/267 |
| 2015/0280801 A1* | 10/2015 | Xin | H04B 7/0478 |
| | | | 370/329 |
| 2015/0288499 A1* | 10/2015 | Nam | H04L 1/0026 |
| | | | 370/329 |
| 2015/0318909 A1* | 11/2015 | Zhang | H04B 7/0413 |
| | | | 375/267 |
| 2016/0191273 A1* | 6/2016 | Nagata | H04W 16/28 |
| | | | 370/252 |
| 2016/0323025 A1* | 11/2016 | Liu | H04B 7/0478 |
| 2016/0373175 A1* | 12/2016 | Harrison | H04B 7/0469 |
| 2017/0019862 A1* | 1/2017 | Goransson | H04B 7/0617 |
| 2017/0047977 A1 | 2/2017 | Kim et al. | |
| 2017/0104517 A1* | 4/2017 | Kakishima | H04B 7/0456 |

OTHER PUBLICATIONS

PCT International Application No. PCT/KR2015/00475, Written Opinion of the International Searching Authority dated Sep. 1, 2015, 34 pages.
Huawei et al., "Impact of coverage modifications", R3-131659, 3GPP TSG-RAN WG3 Meeting #81bis, Sep. 27, 2013, 4 pages.
NSN, "Conclusions from the study on SON for AAS-based deployments", R3-140466, 3GPP TSG-RAN EG3 Meeting #83, Feb. 15, 2014, 2 pages.
State Intellectual Property Office of the People's Republic of China Application Application Serial No. 201580022249.5, Office Action dated Nov. 27, 2018, 17 pages.

* cited by examiner (a)

(b)

(a)

(b)

feedback codeword index $l \in \{1, \cdots L\}$ (a)

BEAMFORMING METHOD IN MULTI-ANTENNA WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2015/004475, filed on May 4, 2015, which claims the benefit of U.S. Provisional Application No. 61/987,502, filed on May 2, 2014, the contents of which are all hereby incorporated by reference herein in their entirety.

TECHNICAL FIELD

The present invention relates to a wireless communication system, and more particularly, to a beamforming method in a multi-antenna wireless communication system and apparatus for the same.

BACKGROUND ART

Multiple-Input Multiple-Output (MIMO) technology is a technology capable of improving data transmission/reception efficiency using multiple transmit (Tx) antennas and multiple receive (Rx) antennas instead of using a single Tx antenna and a single Rx antenna. In particular, a transmitting end or a receiving end of a wireless communication system can increase capability or improve performance using multiple antennas. Accordingly, the MIMO technology can also be referred to as a multi-antenna technology.

In order to support multi-antenna transmission, it may be able to apply a precoding matrix to appropriately distribute transmission information to each antenna according to a channel status and the like. A legacy 3GPP (3rd Generation Partnership Project) LTE (Long Term Evolution) system supports maximum 4 transmission antennas (4 Tx) to perform downlink transmission and defines a precoding codebook according to the transmission antennas.

In a multi-antenna system-based cellular communication environment, data transfer rate can be enhanced via beamforming between a transmitting end and a receiving end. Whether to apply a beamforming scheme is managed based on channel information. In general, it may be able to use a scheme that a receiving end appropriately quantizes a channel estimated by a reference signal and the like using a codebook and gives a transmitting end feedback on the quantized channel.

In the following, a spatial channel matrix (simply, channel matrix) capable of being used for generating a codebook is briefly explained. The spatial channel matrix (or, channel matrix) can be represented as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

In this case, H (i, k) corresponds to a spatial channel matrix, Nr corresponds to the number of reception antennas, Nt corresponds to the number of transmission antennas, r corresponds to an index of an reception antenna, t corresponds to an index of a transmission antenna, i corresponds to an index of an OFDM (or SC-FDMA) symbol, and k corresponds to an index of a subcarrier.

$h_{r,t}(i,k)$ corresponds to an element of a channel matrix H (i, k) indicating a state of an $r^{th}$ channel and a $t^{th}$ antenna on an $i^{th}$ symbol and $k^{th}$ subcarrier.

A spatial channel covariance matrix capable of being used in the present invention is briefly explained in the following. The spatial channel covariance matrix can be represented by such a sign as R. In particular, the spatial channel covariance matrix can be represented as $R=E[H_{i,k}{}^{H}H_{i,k}]$ in this case, H and R correspond to a spatial channel matrix and a spatial channel covariance matrix, respectively. E[ ] corresponds to a mean, i corresponds to a symbol index, and k corresponds to a frequency index.

SVD (singular value decomposition) is one of important methods for decomposing a rectangular matrix. The SCD is widely used in signal processing and statistics. The SVD generalizes a spectrum theory of a matrix in response to a random rectangular matrix. An orthogonal square matrix can be decomposed to a diagonal matrix using the spectrum theory based on an Eigen value. Assume that a channel matrix H corresponds to m×n matrix consisting of a set element of real numbers or complex numbers. In this case, the matrix H can be represented by multiplication of three matrixes described in the following.

$$H_{m \times n} = U_{m \times m} \Sigma_{m \times n} V_{n \times n}{}^{H}$$

In this case, U and V correspond to unitary matrixes and $\Sigma$ corresponds to m×n diagonal matrix including a singular value which is not a negative value. The singular value corresponds to $\Sigma = \mathrm{diag}(\sigma_1 \ldots \sigma_r)$, $\sigma_i = \sqrt{\lambda_i}$. As mentioned above, when a matrix is represented by multiplication of three matrixes, it is referred to as singular value decomposition. It may be able to handle a much more general matrix using the singular value decomposition compared to Eigen value decomposition capable of decomposing an orthogonal square matrix only. The singular value decomposition and the Eigen value decomposition are related to each other.

When a matrix H corresponds to an Hermite matrix which is positive definite, all Eigen values of the H correspond to real numbers which are not negative numbers. In this case, a singular value and a singular vector of the H correspond to real numbers which are not negative numbers. In particular, the singular value and the singular vector of the H become identical to the Eigen value and the Eigen vector of the H. Meanwhile, EVD (Eigen value Decomposition) can be represented as follows (in this case, Eigen value may correspond to $\lambda 1, \ldots, \lambda r$).

$$HH^{H} = (U\Sigma V^{H})(U\Sigma V^{H})^{H} = U\Sigma \Sigma^{T} U^{H}$$

$$H^{H}H = (U\Sigma V^{H})^{H}(U\Sigma V^{H}) = V\Sigma^{T}\Sigma V$$

In this case, Eigen value may correspond to $\lambda 1, \ldots, \lambda r$. When singular value decomposition is performed on $HH^{H}$, it is able to know information on U among U and V that indicate channel direction. When singular value decomposition is performed on $H^{H}H$, it is able to know information on V. In general, each of a transmitting end and a receiving end performs beamforming to achieve a higher transfer rate in MU-MIMO (multi user-MIMO). If a beam of the receiving end and a beam of the transmitting end are represented by a matrix T and a matrix W, respectively, a channel to which beamforming is applied can be represented as THW=TU(Σ)VW. Hence, it may be preferable to generate a reception beam on the basis of the U and generate a transmission beam on the basis of the V to achieve a higher transfer rate.

In general, main concern in designing a codebook is to reduce feedback overhead using the number of bits as small as possible and precisely quantify a channel to achieve sufficient beamforming gain. One of schemes of designing a codebook, which is proposed or selected by recent communication standard such as 3GPP LTE (3rd Generation Partnership Project Long Term Evolution), LTE-Advanced, IEEE 16m system, etc. corresponding to an example of a mobile communication system, is to transform a codebook using a long-term covariance matrix of a channel as shown in equation 1 in the following.

$$W' = \text{norm}(RW) \qquad \text{[Equation 1]}$$

In this case, W corresponds to a legacy codebook for reflecting short-term channel information, R corresponds to a long-term covariance matrix of a channel H, and norm (A) corresponds to a normalized matrix that norm is normalized by 1 according to each column of a matrix A. W' corresponds to a final codebook transformed from the legacy codebook W using the channel matrix H, the long-term covariance matrix R of the channel matrix H and a norm function.

The R, which is the long-term covariance matrix of the channel matrix H, can be represented as equation 2 in the following.

$$R = E[H^H H] = V\Lambda V^H = \sum_{i=1}^{Nt} \sigma_i v_i v_i^H \qquad \text{[Equation 2]}$$

In this case, if the singular value decomposition is performed on the R, which is the long-term covariance matrix of the channel matrix H, the R is decomposed to $V\Lambda V^H$. V corresponds to Nt×Nt unitary matrix and has Vi as an $i^{th}$ column vector. $\Lambda$ corresponds to a diagonal matrix and has $\sigma_i$ as an $i^{th}$ diagonal component. $V^H$ corresponds to an Hermitian matrix of the V. And, $\sigma_i$, $V_i$ respectively correspond to an $i^{th}$ singular value and an $i^{th}$ singular column vector corresponding to the $i^{th}$ singular value ($\sigma_1 \geq \sigma_2 \geq \ldots \geq \sigma_{Nt}$)).

DISCLOSURE OF THE INVENTION

Technical Task

The technical task of the present invention is to provide an improved beamforming method in a multi-antenna wireless communication system and apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first technical aspect of the present invention, provided herein is a beamforming method, which is performed by a base station in a wireless communication system supporting multiple antennas, including: determining a first coverage based on long-term feedback information; configuring multiple logical antenna ports for the first coverage based on combinations of a plurality of horizontal beams and a plurality of vertical beams; and transmitting a channel state information-reference signal to a user equipment according to a precoding matrix index configured with reference to the multiple logical antenna ports, wherein the plurality of the horizontal beams respectively correspond to a plurality of second coverages generated by dividing the first coverage into horizontal domains, and wherein the plurality of the vertical beams respectively correspond to a plurality of third coverages generated by dividing the first coverage into vertical domains.

Additionally, the long-term feedback information may include at least one of an RI (rank indicator) and a PMI (precoding matrix indicator).

Additionally, the multiple logical antenna ports may be sequentially numbered with reference to the horizontal domains and the numbering may be configured such that when all horizontal beams in a specific horizontal domain are numbered, horizontal beams in a next horizontal domain are numbered.

Additionally, the multiple antennas may correspond to cross-polarization antennas, the multiple logical antenna ports may be composed of first logical antenna ports on the basis of first polarization antennas and second logical antenna ports on the basis of second polarization antennas, and the first logical antenna ports and the second logical antenna ports may have the same corresponding weight vectors. Moreover, the beamforming method may further include receiving feedback information indicating a specific logical antenna port among the multiple logical antenna ports from the user equipment. Preferably, the feedback information may include a rank 1 codebook and the rank 1 codebook may be defined based on a horizontal vector indicating a specific horizontal beam among the plurality of the horizontal beams, a vertical vector indicating a specific vertical beam among the plurality of the vertical beams, and a phase correction parameter.

Additionally, the long-term feedback information may be determined based on a reference signal transmitted by the user equipment.

Additionally, the long-term feedback information may be determined based on a reference signal transmitted by the user equipment. Moreover, the beamforming method may further include determining a handover based on a location of the user equipment in accordance with previously stored RSRP (reference signal received power).

In a second technical aspect of the present invention, provided herein is a base station for performing beamforming in a wireless communication system supporting multiple antennas, including: a radio frequency unit; and a processor, wherein the processor is configured to determine a first coverage based on long-term feedback information, configure multiple logical antenna ports for the first coverage based on combinations of a plurality of horizontal beams and a plurality of vertical beams, and transmit a channel state information-reference signal to a user equipment according to a precoding matrix index configured with reference to the multiple logical antenna ports, wherein the plurality of the horizontal beams respectively correspond to a plurality of second coverages generated by dividing the first coverage into horizontal domains, and wherein the plurality of the vertical beams respectively correspond to a plurality of third coverages generated by dividing the first coverage into vertical domains.

Advantageous Effects

According to embodiments of the present invention, an improved beamforming method in a wireless communication system and apparatus for the same can be provided.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention:

FIGS. 12 to 15 are reference diagrams for explaining embodiments of the present invention;

BEST MODE FOR INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

As an example of a mobile communication system to which the present invention is applicable, a 3rd Generation Partnership Project Long Term Evolution (hereinafter, referred to as LTE) communication system is described in brief.

Figure 1:
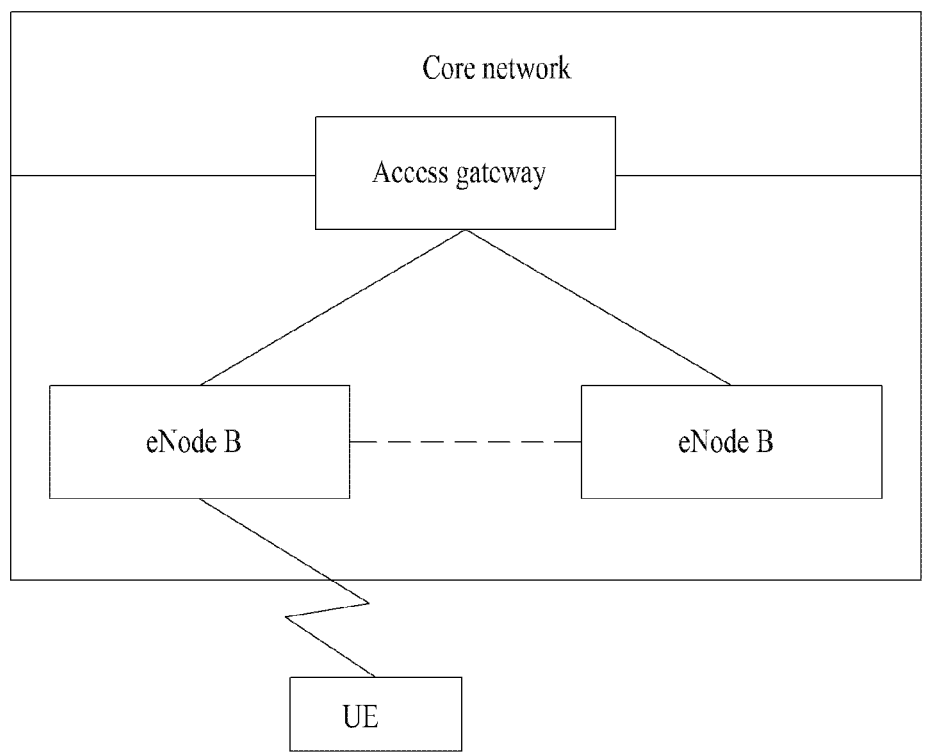
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 2:
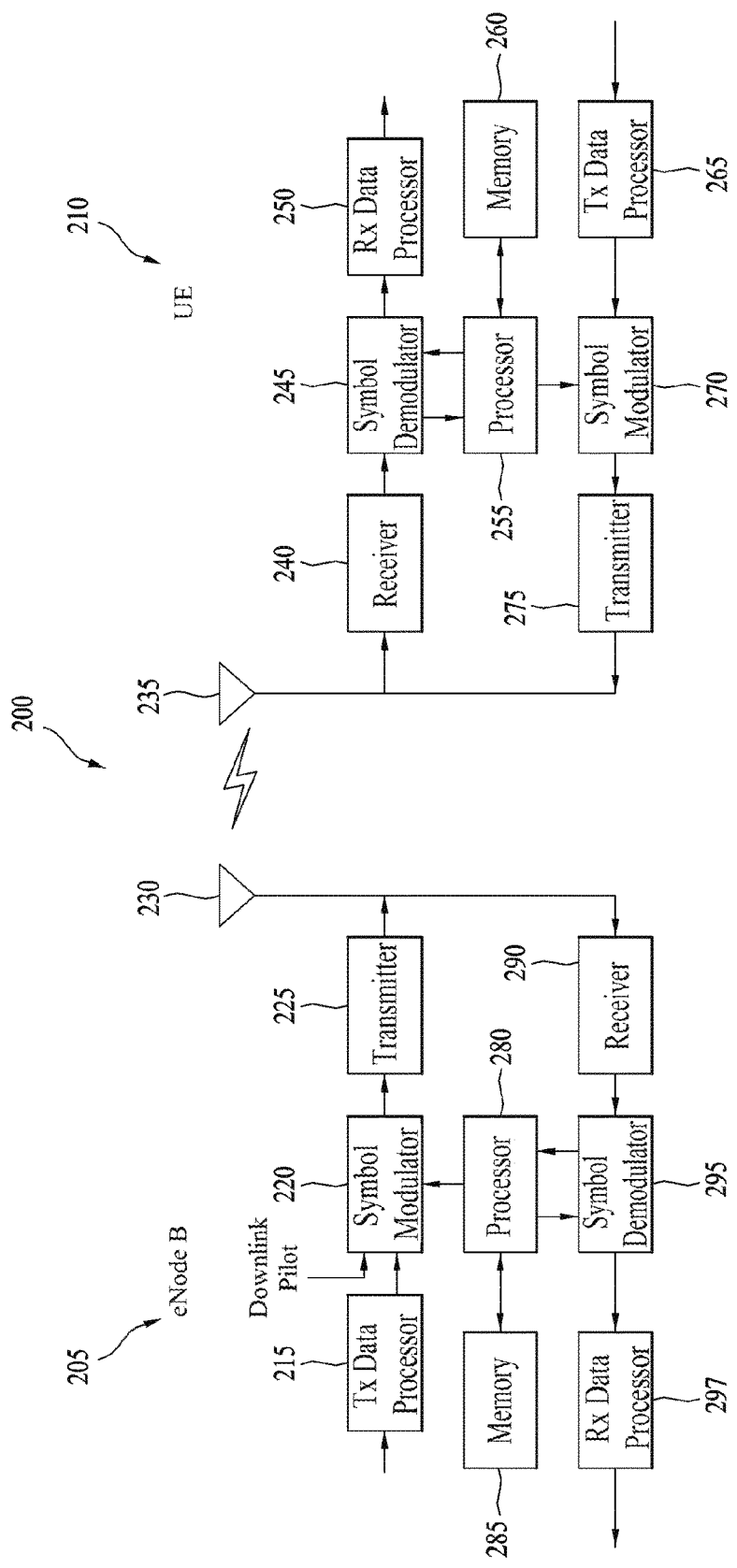
FIG. 2 is a block diagram illustrating configurations of a base station 205 and a user equipment 210 in a wireless communication system 200 according to the present invention.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more user equipments.

Referring to FIG. 2, the base station 105 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 255, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the downlink signals are transmitted to the user equipment through the antenna 230.

In the user equipment 210, the antenna 235 receives the downlink signals from the base station 205 and provides the received signals to the receiver 240. The receiver 240 controls (for example, filters, amplifies and frequency downcoverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The uplink signals are transmitted to the base station 205 through the antenna 235.

The uplink signals are received in the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

Multiple Antenna System

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 3:
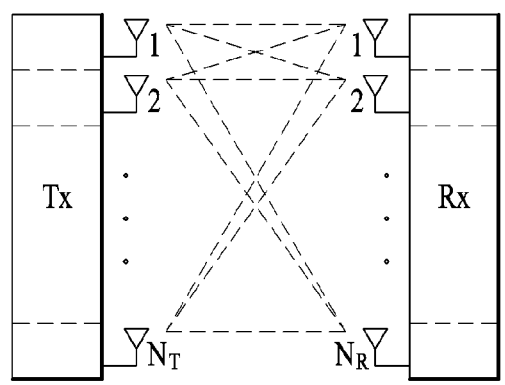
FIG. 3 is a diagram for a configuration of a general MIMO communication system.
Figure 3:
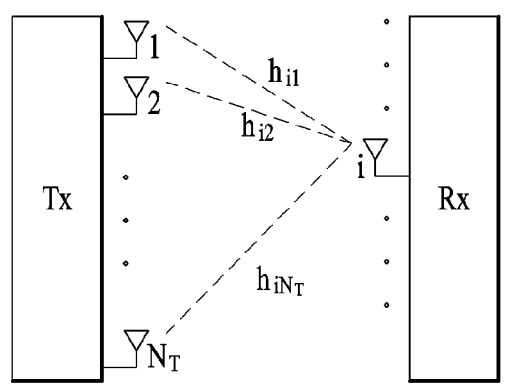

FIG. 3(a) shows the configuration of a wireless communication system including multiple antennas. As shown in FIG. 3(a), the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 3.

$$R_i = \min(N_T, N_R) \qquad \text{[Equation 3]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 4.

$$s = [s_1, s_2, \ldots, s_{N_T}]^T \qquad \text{[Equation 4]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 5.

$$\hat{s} = [\hat{s}_1, \hat{s}_2, \ldots, \hat{s}_{N_T}]^T = [Ps_1, Ps_2, \ldots, Ps_{N_T}]^T \qquad \text{[Equation 5]}$$

In Equation 5, ŝ is a transmission vector, and can be represented by the following equation 6 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 6]}$$

In the meantime, the information vector Ŝ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 7 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} \qquad \text{[Equation 7]}$$

-continued $$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPS$$

Given $N_R$ Rx antennas, signals received at the respective Rx antennas, $y_1, y_2, \ldots, y_{N_T}$ may be represented as the following vector.

$$y=[y_1, y_2, \ldots, y_{N_R}]^T \quad \text{[Equation 8]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 3(b) illustrates channels from $N_T$ Tx antennas to an $i^{th}$ Rx antenna.

As illustrated in FIG. 3(b), the channels from the NT Tx antennas to an $i^{th}$ Rx antenna may be expressed as follows.

$$h_i^T = [h_{i1}, h_{i2}, \ldots, h_{iN_T}] \quad \text{[Equation 9]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 10]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n=[n_1, n_2, \ldots, n_{N_R}]^T \quad \text{[Equation 11]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} \quad \text{[Equation 12]}$$

$$= \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 13]}$$

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) 5-VAP for mixing multiple codewords between antennas in spatial diversity or spatial multiplexing and an SCW (single codeword) 5-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as equation 14 and equation 15, respectively. The equation 14 indicates a block code in case of 2 transmission antennas and the equation 15 indicates a block code in case of 4 transmission antennas.

$$\frac{1}{\sqrt{2}}\begin{pmatrix} S_1 & S_2 \\ -S_2^* & S_1^* \end{pmatrix} \quad \text{[Equation 14]}$$

$$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 15]}$$

In the equations 14 and 15, Si (i=1, 2, 3, 4) corresponds to a modulated data symbol. And, in the equations 14 and 15, a row of a matrix corresponds to an antenna port and a column of the matrix corresponds to time (STBC) or frequency (SFBC).

Figure 4:
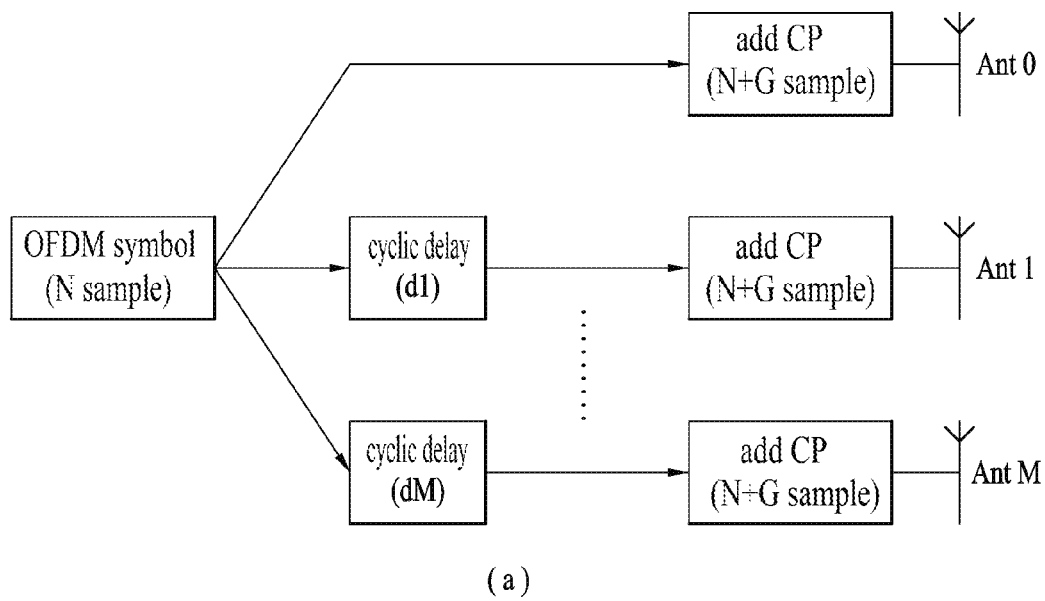
FIG. 4 is a diagram for an example of a general CDD structure in a MIMO system.
Figure 4:
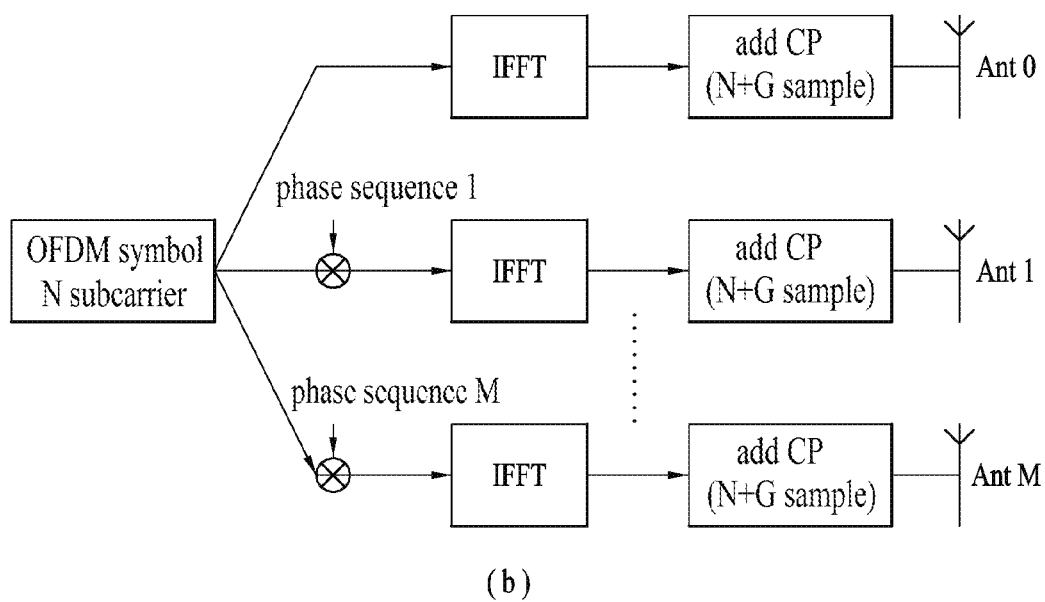

Meanwhile, among the aforementioned MIMO transmission schemes, the CDD scheme corresponds to a scheme of increasing frequency diversity by increasing delay propagation on purpose. FIG. 4 shows an example of a general CDD structure in a multi-antenna system. FIG. 4 (a) shows a scheme of applying cyclic delay in time domain. As shown in FIG. 4 (b), the CDD scheme applying the cyclic delay of FIG. 4 (a) can also be implemented by applying phase-shift diversity.

Codebook-Based Precoding Scheme

In order to support MIMO antenna transmission, it may be able to apply precoding configured to appropriately distribute transmission information to each of multiple antennas according to a channel status and the like. A codebook-based precoding scheme corresponds to a scheme that a transmitting end and a receiving end determine a set of precoding matrixes in advance, the receiving end measures channel information from the transmitting end and gives feedback on a most suitable precoding matrix (i.e., precoding matrix index (PMI) to the transmitting end, and the transmitting end applies appropriate precoding to signal transmission based on the PMI.

Since the codebook-based precoding scheme is a scheme of selecting an appropriate precoding matrix from the predetermined set of precoding matrixes, although an optimized precoding is not always applied, feedback overhead can be reduced compared to a case of explicitly giving feedback on optimized precoding information to actual channel information.

Figure 5:
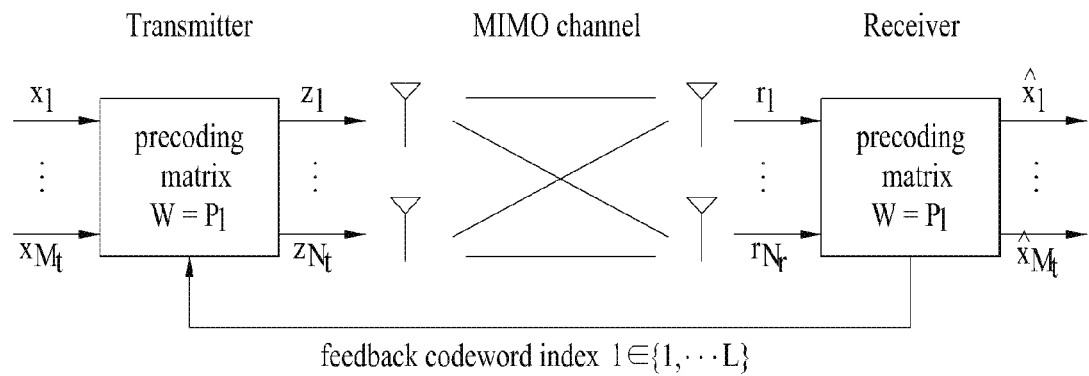
FIG. 5 is a diagram for explaining a basic concept of a codebook-based precoding.

FIG. 5 is a diagram for explaining a basic concept of a codebook-based precoding.

In case of following a codebook-based precoding scheme, a transmitting end and a receiving end share codebook information including the prescribed number of precoding matrixes, which are predetermined according to a transmission rank, the number of antennas, and the like. In particular, when feedback information is finite, the codebook-based precoding scheme can be used. The receiving end measures a channel state via a reception signal and may be then able to give feedback on information on the finite number of preferred precoding matrixes (i.e., an index of a corresponding precoding matrix) to the transmitting end based on the aforementioned codebook information. For instance, the receiving end measures a reception signal using ML (maximum likelihood) or MMSE (minimum mean square error) scheme and may be then able to select an optimized precoding matrix. Although FIG. 5 shows a case that the receiving end transmits precoding matrix information to the transmitting end according to a codeword, by which the present invention may be non-limited.

Having received the feedback information from the receiving end, the transmitting end can select a specific precoding matrix from a codebook based on the received information. The transmitting end, which has selected the precoding matrix, performs precoding in a manner of multiplying the number of layer signals corresponding to a transmission rank by the selected precoding matrix and may be then able to transmit a transmission signal on which the precoding is performed via a plurality of antennas. In a precoding matrix, the number of rows is identical to the number of antennas and the number of columns is identical to a rank value. Since the rank value is identical to the number of layers, the number of columns is identical to the number of layers. For instance, if the number of transmission antennas corresponds to 4 and the number of transmission layers corresponds to 2, a precoding matrix can be configured by a 4×2 matrix. Information transmitted via each layer can be mapped to each antenna through the precoding matrix.

Having received a signal, which is transmitted from the transmitting end in a manner of being pre-coded, the receiving end can restore the received signal in a manner of performing reverse processing on the precoding processed in the transmitting end. In general, since a precoding matrix satisfies a unitary matrix (U) condition such as $U * U^H = I$, the reverse processing performed on the precoding can be performed using a scheme of multiplying Hermite matrix ($P^H$) of a precoding matrix (P) used in the precoding of the transmitting end by the received signal.

For instance, Table 1 in the following shows a codebook used for downlink transmission using 2 transmission antennas in 3GPP LTE release-8/9 and Table 2 in the following shows a codebook used for downlink transmission using 4 transmission antennas in 3GPP LTE release-8/9.

TABLE 1

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ can be obtained by a set $\{s\}$ configured from an equation represented as $W_n = I - 2u_n u_n^H / u_n^H u_n$. In this case, I indicates a 4×4 single matrix and $u_n$ is a value given in Table 2.

As shown in Table 1, in case of a codebook for 2 transmission antennas, it may have total 7 precoding vectors/matrixes. In this case, since a single matrix is used for an open-loop system, total 6 precoding vectors/matrixes are used for a close-loop system. And, in case of a codebook for 4 transmission antennas shown in Table 2, it may have total 64 precoding vectors/matrixes.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{\pm 1, \pm j, \pm \frac{(1+j)}{\sqrt{2}}, \pm \frac{(-1+j)}{\sqrt{2}}\right\}.$$

In Table 2, $W_n^{\{s\}}$ can be obtained from a set $\{s\}$ configured by an equation represented as $W_n = I - 2u_n u_n^H / u_n^H u_n$. In this case, I corresponds to 4×4 single matrix and $u_n$ corresponds to a value given by Table 2.

As shown in Table 1, a codebook for two transmission antennas includes 7 precoding vectors/matrixes in total. In this case, since a single matrix is used for an open-loop system, for precoding of a closed-loop system, there are 6 precoding vectors/matrixes in total. And, as shown in Table 2, a codebook for 4 transmission antennas has 64 precoding vectors/matrixes in total.

The aforementioned codebook has a common property such as a CM (constant modulus) property, a nested property, a constrained alphabet property, and the like. The CM property corresponds to a property that each element of all precoding matrixes in a codebook does not include '0' and has a same size. The nested property corresponds to a property that a precoding matrix of a lower rank is configured by a subset of a specific column of a precoding matrix of a higher rank. The constrained alphabet property corresponds to a property that an alphabet of each element of all precoding matrixes in a codebook is configured by $$\left\{\pm 1, \pm j, \pm \frac{(1+j)}{\sqrt{2}}, \pm \frac{(-1+j)}{\sqrt{2}}\right\}.$$

Feedback Channel Structure

Basically, since a base station is unable to know information on a downlink channel in FDD (frequency division duplex) system, the base station uses channel information fed back by a UE for downlink transmission. In case of a legacy 3GPP LTE release-8/9 system, a UE can feedback downlink channel information via PUCCH or PUSCH. In case of the PUCCH, the PUCCH periodically feedbacks channel information. In case of the PUSCH, the PUSCH aperiodically feedbacks channel information according to a request of the base station. And, channel information can be fed back in response to the whole of assigned frequency bands (i.e., wideband (WB)) or the specific number of RBs (i.e., subband (SB)).

Extended Antenna Configuration

Figure 6:
FIG. 6 is a diagram for examples of configuring 8 transmission antennas.
Figure 6:
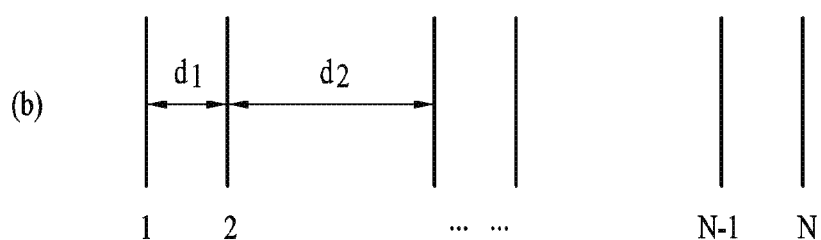
Figure 6:
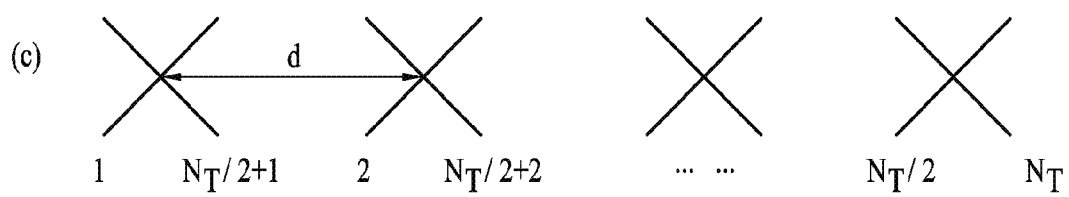

FIG. 6 is a diagram for examples of configuring 8 transmission antennas.

FIG. 6 (a) shows a case that N numbers of antennas configure an independent channel without grouping. In general, this case is referred to as an ULA (uniform linear array). If a plurality of antennas are deployed in a manner of being apart from each other, a space of a transmitter and/or a receiver may not be sufficient enough for configuring channels independent from each other.

FIG. 6 (b) shows an antenna configuration (paired ULA) of a ULA scheme that two antennas make a pair. In this case, an associated channel may exist between the two antennas making a pair and an independent channel may exist with an antenna of a different pair.

Meanwhile, unlike a legacy 3GPP LTE release-8/9 using 4 transmission antennas in downlink, 3GPP LTE release-10 system may use 8 transmission antennas in downlink. In order to apply the extended antennas configuration, it is necessary to install many antennas in an insufficient space. Hence, the ULA antenna configurations shown in FIGS. 6 (a) and (b) may not be appropriate for the extended configuration. Hence, as shown in FIG. 6 (c), it may consider applying a dual-pole (or cross-pole) antenna configuration.

If transmission antennas are configured using the dual-pole (or cross-pole) antenna configuration, although a distance d between antennas is relatively short, it is able to transmit data of high throughput by lowering antenna correlation.

Codebook Structures

As mentioned in the foregoing description, if a predefined codebook is shared between a transmitting end and receiving end, it is able to reduce overhead of the receiving end resulted from making a feedback on precoding information to be used for MIMO transmission of the transmitting end. Hence, it is able to apply efficient precoding.

As an example of configuring a predetermined codebook, it may be able to configure a precoder matrix using a DFT (Discrete Fourier Transform) matrix or a Walsh matrix. Or, it may be able to configure a precoder of various forms in a manner of combining with a phase shift matrix or a phase shift diversity matrix.

In case of a co-polarization antenna system, a codebook of a DFT system shows good performance. In this case, when the DFT matrix-based codebook is configured, n×n DFT matrix can be defined as equation 16 in the following.

$$DFTn: D_n(k, \ell) = \frac{1}{\sqrt{n}}\exp(-j2\pi k\ell/n),$$
$$k, \ell = 0, 1, \ldots, n-1$$

[Equation 16]

The DFT matrix shown in the equation 16 exists as a single matrix in response to a specific size n. Hence, in order to define various precoding matrixes and appropriately use the various precoding matrixes according to a situation, it may consider additionally configuring and using a rotated version of a DFTn matrix. Equation 17 in the following shows an example of a rotated DFTn matrix.

$$\text{rotated } DFTn: D_n^{(G,g)}(k, \ell) =$$
$$\frac{1}{\sqrt{n}}\exp(-j2\pi k(\ell + g/G)/n),$$
$$k, \ell = 0, 1, \ldots, n-1, g = 0, 1, \ldots, G.$$

[Equation 17]

If a DFT matrix is configured using the equation 17, it may be able to generate G number of rotated DFTn matrixes and the generated matrixes satisfy a property of a DFT matrix.

In the following, a householder-based codebook structure is explained. The householder-based codebook structure corresponds to a codebook configured by a householder matrix. The householder matrix is a matrix used for householder transform. The householder transform is a sort of linear transformations and can be used for performing QR decomposition. The QR decomposition is to decompose a matrix into an orthogonal matrix (Q) and an upper triangular matrix (R). The upper triangular matrix corresponds to a square matrix that all components below a main diagonal line component are 0. An example of 4×4 householder matrix is shown in equation 18 in the following.

$$M_1 = I_4 - 2u_0 u_1^H/\|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$
$$u_0^T = [1 \quad -1 \quad -1 \quad -1]$$

[Equation 18]

It may be able to generate 4×4 unitary matrix including a CM property by the householder transform. Similar to a codebook for 4 transmission antennas shown in Table 2, n×n precoding matrix can be generated using the householder transform and it may be able to configure the precoding matrix to be used for rank transmission less than n using a column subset of the generated precoding matrix.

Codebook for 8 Transmission Antennas

In 3GPP LTE release-10 system including an extended antenna configuration (e.g., 8 transmission antennas), it may be able to apply a feedback scheme previously used in a legacy 3GPP LTE release-8/9 system in a manner of extending the feedback scheme. For example, it may be able to feedback such channel state information (CSI) as an RI (rank indicator), a PMI (precoding matrix index), CQI (channel quality information) and the like. In the following, a method of designing a dual precoder-based feedback codebook capable of being used in a system supporting an extended antenna configuration is explained. In order to indicate a precoder to be used for MIMO transmission of a transmitting end in the dual precoder-based feedback codebook, a receiving end can transmit a precoding matrix index to the transmitting end. A precoding matrix can be indicated by a combination of two PMIs different from each other. In particular, if the receiving end feedbacks the two PMIs different from each other (i.e., a first PMI and a second PMI) to the transmitting end, the transmitting end determines a precoding matrix indicated by the first and the second PMI and may be then able to apply the determined precoding matrix to MIMO transmission.

In designing the dual precoder-based feedback codebook, it may consider MIMO transmission transmitted by 8 transmission antennas, whether or not single user-MIMO (SU-MIMO) and multiple user-MIMO (MU-MIMO) are supported, suitability of various antenna configurations, a reference of codebook design, a size of a codebook, and the like.

When a codebook is applied to MIMO transmission transmitted by 8 transmission antennas, if the codebook is greater than rank 2, SU-MIMO is supported only. If the codebook is equal to or less than the rank 2, it may consider designing a feedback codebook optimized to both the SU-MIMO and the MU-MIMO and the feedback codebook appropriate for various antenna configurations.

Regarding the MU-MIMO, it may be preferable to make UEs participating in the MU-MIMO to be separated from each other in a correlation domain. Hence, it is necessary to design a codebook for the MU-MIMO to be properly operated on a channel of high correlation. Since DFT vectors provide good performance on the channel of high correlation, it may consider including a DFT vector in a set of codebooks up to rank-2. And, in high scattering propagation environment (e.g., indoor environment including many reflected waves) capable of generating many spatial channels, a SU-MIMO operation may be more suitable as a MIMO transmission scheme. Hence, it may be able to configure a codebook for a rank greater than rank-2 to have good performance of identifying multiple layers.

When a precoder for MIMO transmission is designed, it may be preferable to make a precoder structure have good performance in response to various antenna configurations (low correlation, high correlation, cross-polarization, and the like). In case of arranging 8 transmission antennas, it may be able to configure a cross-polarization array including 4λ antenna space as a low-correlation antenna configuration, a ULA including 0.5λ antenna space as a high-correlation antenna configuration, or a cross-polarization array including 0.5λ antenna space as a cross-polarization antenna configuration. A DFT-based codebook structure can provide good performance in response to the high-correlation antenna configuration.

Meanwhile, block diagonal matrixes may be more suitable for the cross-polarization antenna configuration. Hence, if a diagonal matrix is introduced to a codebook for 8 transmission antennas, it is able to configure a codebook capable of providing goof performance to all antenna configurations.

As mentioned in the foregoing description, a reference of codebook design is to satisfy a unitary codebook, a CM property, a constrained alphabet property, an appropriate codebook size, a nested property and the like. The reference is applied to 3GPP LTE release-8/9 codebook design. It may consider applying the reference of codebook design to 3GPP LTE release-10 codebook design supporting an extended antenna configuration as well.

In relation to a size of a codebook, in order to sufficiently support a merit of using 8 transmission antennas, it is necessary to increase the size of the codebook. In order to obtain a sufficient precoding gain from the 8 transmission antennas in low correlation environment, a codebook (e.g., a codebook of a size greater than 4 bits in response to a rank 1 and a rank 2) of a big size may be required. A codebook of a size of 4 bits may be sufficient in obtaining a precoding gain in high correlation environment. Yet, in order to achieve a multiplexing gain of the MU-MIMO, it may be able to increase a codebook size for the rank 1 and the rank 2.

Based on the aforementioned description, the present invention will be explained in the following.

As a technology for a 3D MIMO system, the present invention proposes a codebook design for determining directions of segmented beams on the assumption that a base station knows an approximate (i.e., specific boundary) beam direction. Further, a method of using a location of a UE for obtaining the approximate beam direction is also described in the present invention. Although the present invention is described based on the 3D MIMO system for convenience, the invention can also be applied to a general MIMO system.

In a wireless communication system after LTE Rel-12, the introduction of an antenna system utilizing AAS has been discussed. Since each antenna in the AAS corresponds to an active antenna including an active circuit, an antenna pattern can be changed in order to adapt to a wireless communication environment. Thus, in the AAS, interference can be reduced and beamforming can be efficiently performed.

Moreover, if the AAS is established in two dimensions (i.e., 2D-AAS), it is possible to not only adjust a beam direction at a main lobe of each antenna not only in the horizontal direction but in the vertical direction. Thus, the beam adaptation can be performed more efficiently in three dimensions. Based on the above beam adaptation, it is possible to actively change a transmitted beam depending on a location of a UE.

Figure 7:
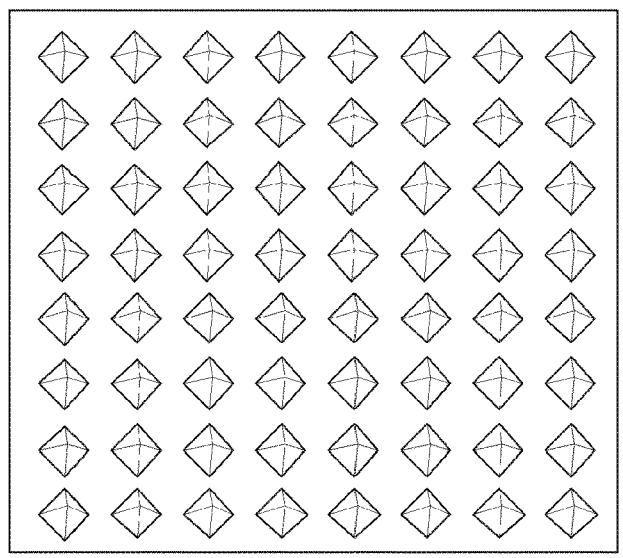
FIG. 7 is a diagram for an active antenna system (AAS)

FIG. 7 is a reference diagram for explaining 2D-AAS to which the present invention can be applied. According to the 2D-AAS shown in FIG. 7, a multi-antenna system can be established by arranging a large number of antennas in the vertical and the horizontal directions.

That is, when the 2D-AAS shown in FIG. 7 is introduced, since a large number of antennas are installed in a vertical antenna domain, it is expected that the number of antennas is remarkably increased. To manage such a large number of the antennas, reference signal (RS) design for measuring a channel at each antenna and feedback design for informing a UE of channel information between each antenna and the UE becomes very important. The reason for this is that as the number of antennas increases, RS overhead and feedback overhead increases either linearly or exponentially in general.

There may be various methods for solving such a problem. As one of them, parameters with long-term characteristics in CSI, which are fed back by a UE in the current LTE system, may be transmitted to a base station using a different method rather than the feedback from the UE, whereas parameters with short term characteristics may be transmitted to the base station through the feedback from the UE. Typically, an RI may be included in the parameters with the long-term characteristics and some PMIs may also have the long-term characteristics.

To inform the base station of the parameters with the long-term characteristics, the following two methods may be considered: 1) a method for a UE to transmit a reference signal to a base station; and 2) a method for a base station to use location information of a UE.

First Embodiment

First of all, a method for a UE to transmit a reference signal to a base station is described. The UE transmits a reference signal to a base station. After measuring a channel value through multiple antennas, the base station calculates feedback parameters with long-term characteristics. Moreover, according to the present invention, the base station may transmit a discovery reference signal (DRS) to the UE and the UE may provide feedback of RSRP (reference signal received power) for the DRS with respect to all antenna ports (here, the DRS may be configured based on a CSI-RS or CRS). Accordingly, the UE may transmit an uplink reference signal related to the feedback or report the feedback.

First, it is assumed that the base station knows a PMI with long-term characteristics. In this case, the PMI with the long-term characteristics may be considered as a beam direction at a specific boundary between the base station and the UE. For instance, in the current LTE system, the codebook for 8-port transmission antennas is composed of W1 corresponding to the PMI with the long-term characteristics and W2 corresponding to a PMI with short term characteristics. In other words, it can be assumed that the base station knows the W1 corresponding to the PMI with the long-term characteristics.

Figure 8:
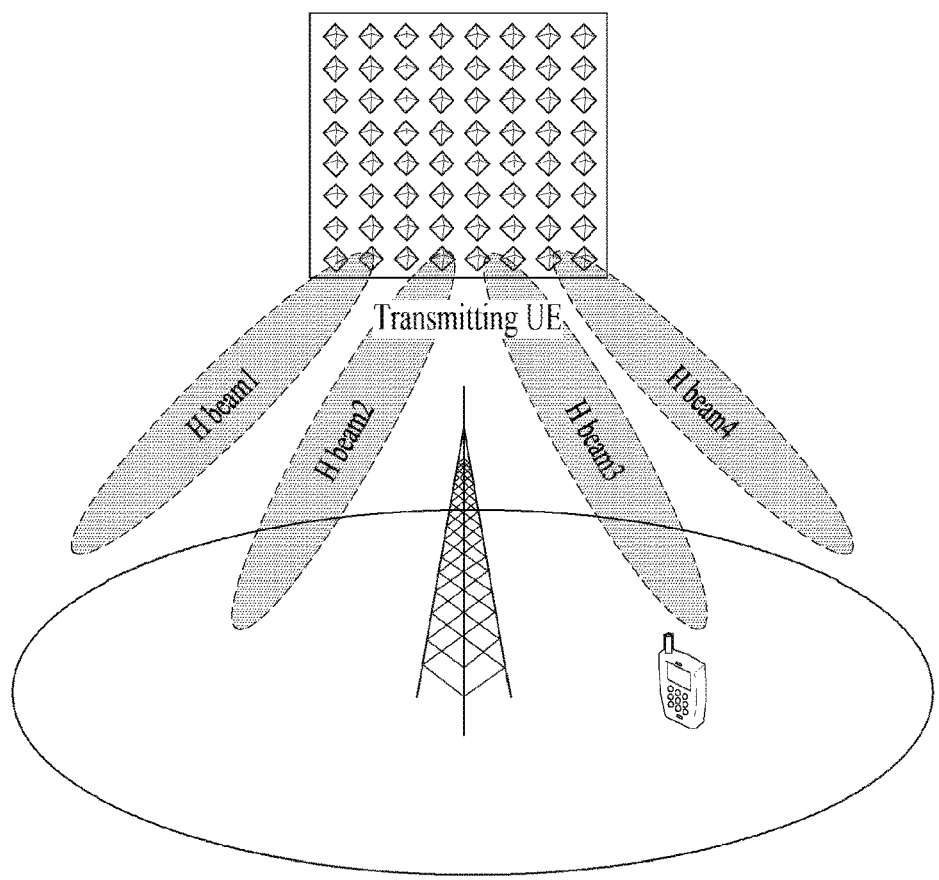
FIG. 8 and FIG. 9 illustrate cases in which a PMI with long-term characteristics represents a beam direction at a specific boundary between a base station and a UE.
Figure 9:
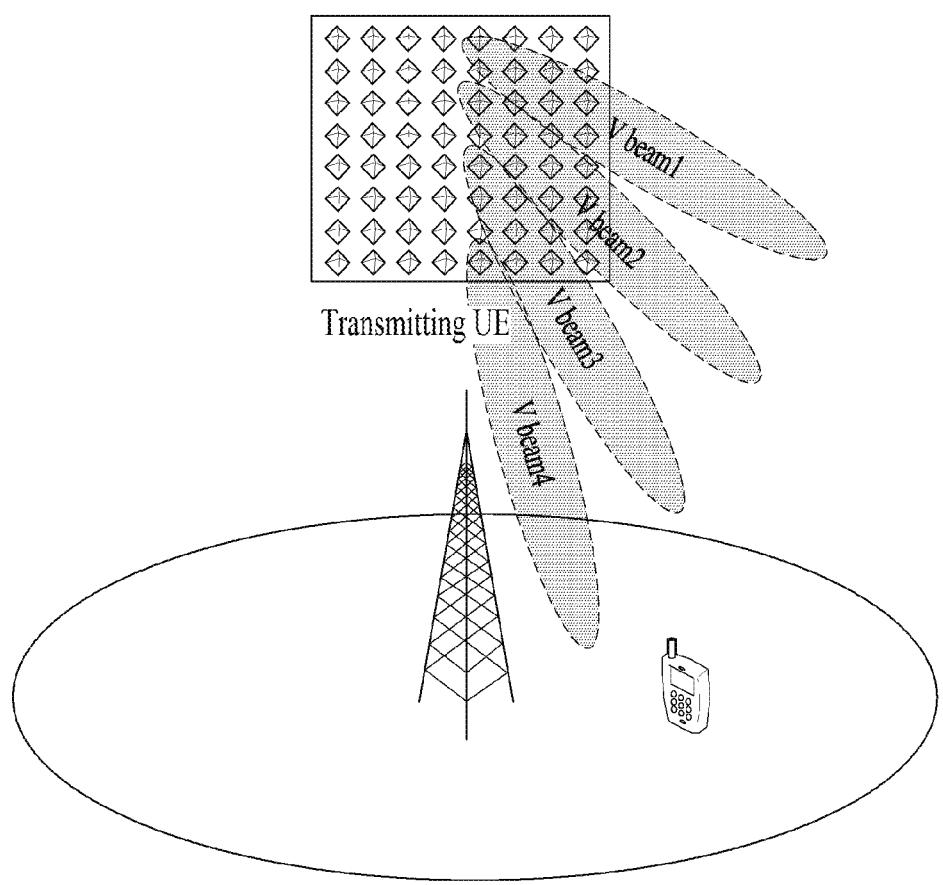

FIG. 8 and FIG. 9 are reference diagrams for describing cases in which a PMI with long-term characteristics represents a beam direction at a specific boundary between a base station and a UE.

For instance, FIG. 8 shows four horizontal beam directions towards a UE and FIG. 9 shows four vertical beam directions towards the UE. To indicate one final beam, one of the four horizontal beams of FIG. 8 and one of the four vertical beams of FIG. 9 should be combined. That is, referring to FIG. 8 and FIG. 9, it can be assumed that the number of representable beams is 16. Among the beams, horizontal beam 3 and vertical beam 3 are close to the UE. Thus, one beam by obtained by combining the horizontal beam 3 and the vertical beam 3 can be assumed to be a long-term PMI for the UE. Granularity of such a long-term PMI may be previously determined by the base station.

Figure 10:
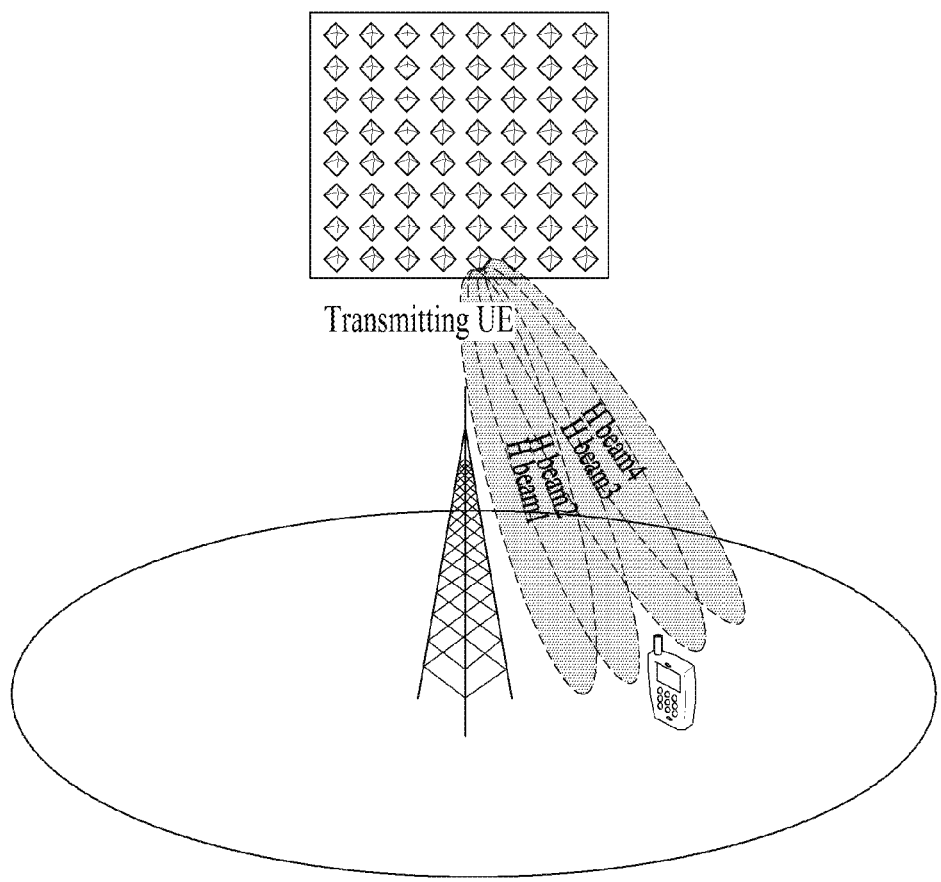
FIG. 10 illustrates beams segmented from one of horizontal beams towards a UE.
Figure 11:
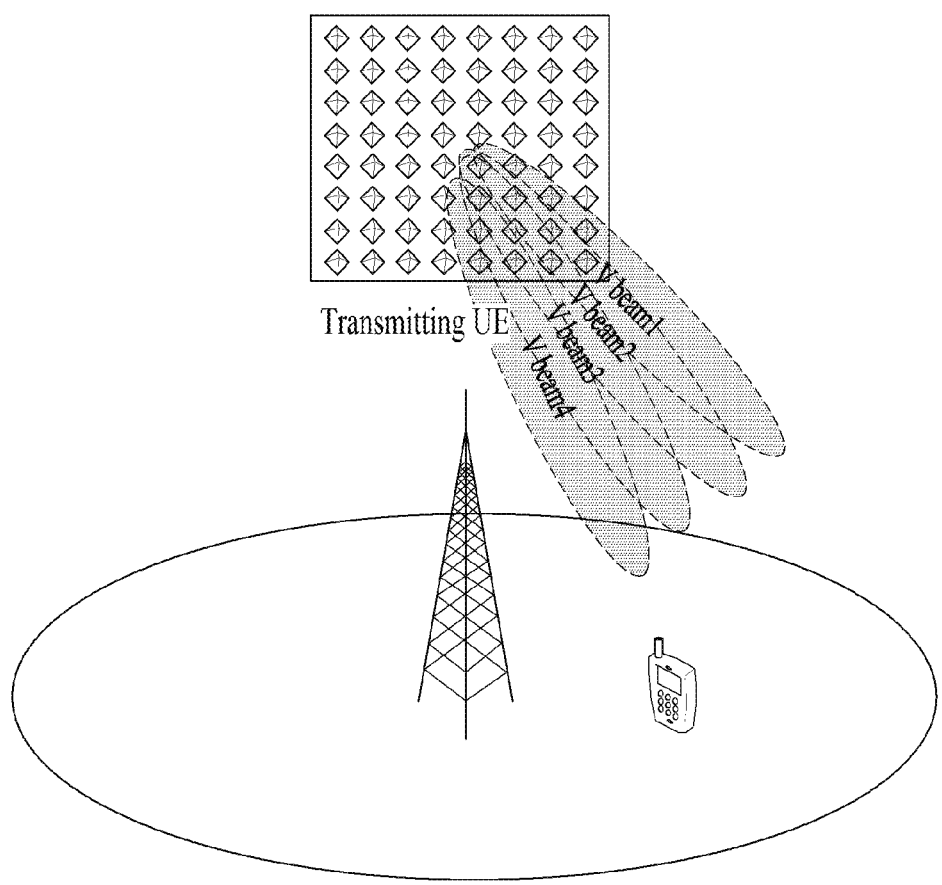
FIG. 11 illustrates beams segmented from one of vertical beams towards a UE.

In the situation in which the base station knows the long-term PMI, the base station may configure a plurality of beams with a direction similar to that of the long-term PMI. For instance, FIG. 10 shows four beams segmented towards the direction of the H beam 3 among the horizontal beams towards the UE shown in FIG. 8. FIG. 11 shows four beams segmented towards the direction of the V beam 3 among the vertical beams towards the UE shown in FIG. 9. Since the base station already knows the beam direction at the specific boundary, the base station may configure a plurality of segmented beams.

First of all, a number is assigned to each of the segmented beams such a manner that as a difference between numbers assigned to respective horizontal beams and vertical beams decreases, a correlation value increases (e.g., horizontal beams 1, 2, 3, . . . , and vertical beams 1, 2, 3, . . . ). Thereafter, ports obtained by combing the first vertical beam and an $n^{th}$ horizontal beam are arranged in order of n in the bottom line of a two-dimensional logical antenna domain. In the second bottom line, ports obtained by combing the second vertical beam and the $n^{th}$ horizontal beam are arranged in order of n. Similarly, in an $m^{th}$ line from the bottom, ports obtained by combining an $m^{th}$ vertical beam and the $n^{th}$ horizontal beam are arranged in order of m. In other words, vertical beams and horizontal beams are combined sequentially and the resultant combinations are arranged according to a specific order. By doing so, logical antenna ports are configured and then precoding matrix for the logical antenna ports is also configured. Thereafter, CSI-RSs are configured with reference to the generated logical antenna ports. A mapping relation between the logical antenna ports and the CSI-RSs may be predetermined between the transmitting and receiving ends or may be indicated through high layer signaling. Further, the number of the segmented horizontal beams and the number of the segmented vertical beams may be determined by the base station depending on situations. Alternatively, they may be defined in advance.

If the base station uses a cross-polarization (hereinafter abbreviated as cross-pole) antenna, there are actually two antennas at the same location. For convenience of description, the two antennas are expressed as '\' and '/', respectively. If weigh vectors for creating the horizontal beams shown in FIG. 10 are respectively defined as p1, p2, p3, and p4, it is possible to create four more beams by applying the weight vectors p1, p2, p3, and p4 to the '\' antennas. Similarly, by applying the same weight vectors p1, p2, p3, and p4 to the '/' antennas, four more beams are created. In the case of the vertical beams, beams are doubled by applying the weight vectors (i.e., the weight vectors are applied to both of the '\' antennas and the '/' antennas). In this way, two more beams are created in every vertical beam and horizontal beam by applying the same weight vectors to the '\' antennas and the '/' antennas. Thereafter, a precoding matrix for logical antenna ports for the '\' antennas and logical antenna ports for the '/' antennas may be configured according to the above-mentioned processes. That is, the vertical beams and the horizontal beams are combined sequentially and the resultant combinations are arranged according to the specific order. By doing so, the logical antenna ports are configured and then the precoding matrix for the logical antenna ports are also configured. Thereafter, the logical ports for the '\' antennas and the logical ports for the '/' antennas are overlapped. If the '\' antennas and the '\' antennas have the same weight vector, they are located at the same position. Further, the number of the segmented horizontal beams and the number of the segmented vertical beams may be determined by the base station depending on situations. Alternatively, they may be defined in advance.

Details of the embodiments of the present invention will be described with reference to FIGS. 12 to 15.

Figures 12, 13:
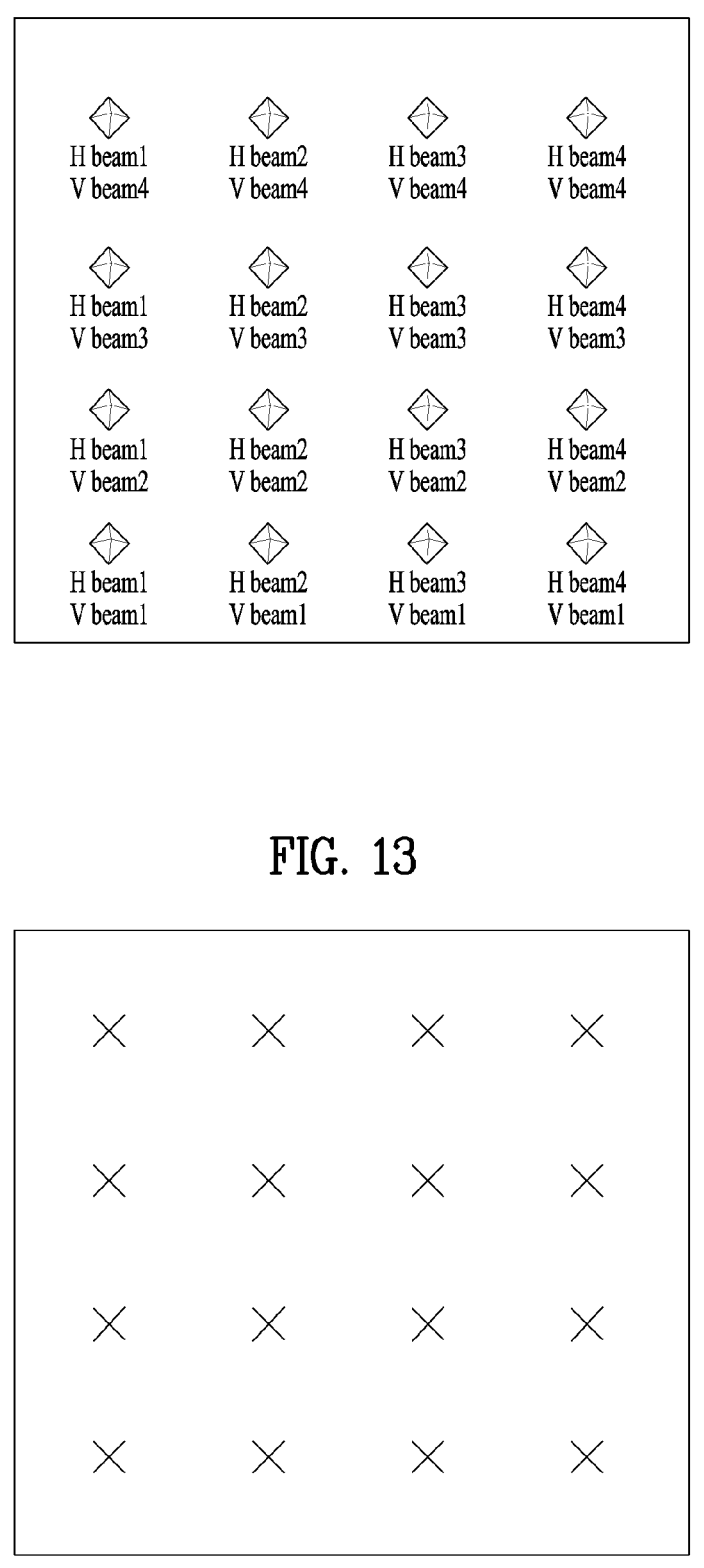

As shown in FIG. 12, a method for configuring segmented beams according to the present invention can be implemented by respectively combining the horizontal beams shown in FIG. 10 and the vertical beams shown in FIG. 11. For convenience of description, it is shown at the bottom of each logical port of FIG. 12 that which horizontal beam and which vertical beam are used to create the corresponding logical port. In addition, it can be seen that the beams shown in FIG. 10 and FIG. 11 are arranged such that beams in a high correlation relationship are matched with each other.

Figure 14:
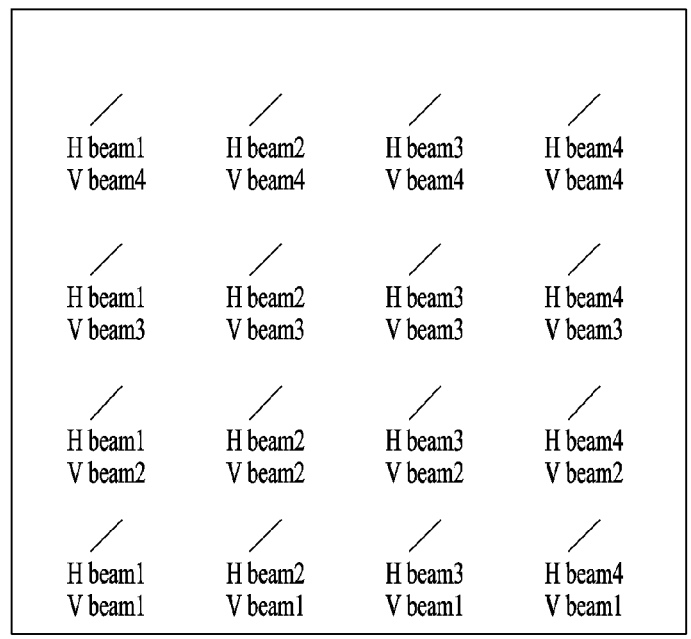
Figure 15:
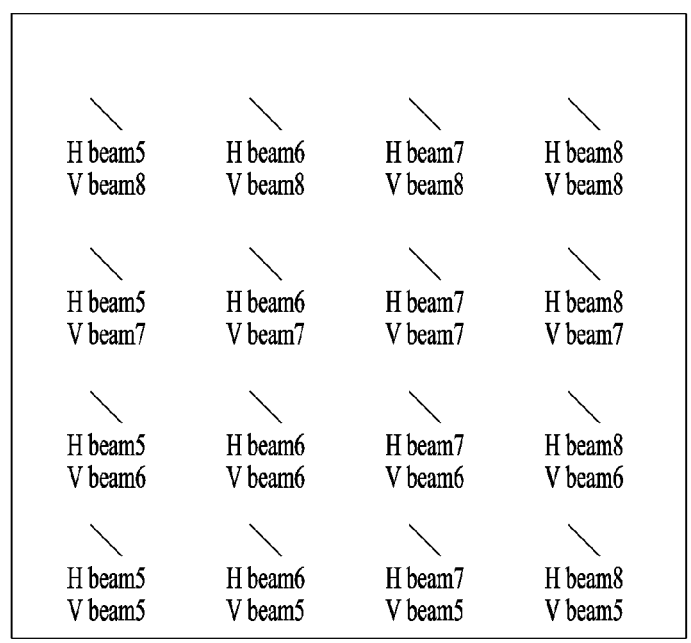

Further, in the case of the cross-polarization antenna, the four horizontal beams of FIG. 10 are applied to the '/' antennas for beam generation. In addition, four beams having the same weight vectors as those of the generated four horizontal beams are applied to the '\' antennas so that a total of eight beams are generated. Similarly, for beam generation, the four vertical beams of FIG. 11 are applied to the '/' antennas. In addition, four beams having the same weight vectors as those of the generated four horizontal weight vectors are applied to the '\' antennas so that a total of eight beams are generated. That is, sixteen antenna ports are generated by combining the four horizontal beams and the four vertical beams for the '/' antennas and other sixteen antenna ports are generated by combining the four horizontal beams and the four vertical beams for the '\' antennas. The pair of '/' and '\' among a total of 32 ports are arranged at the same logical antenna port position. This can be expressed as shown in FIG. 13. In the case of the '/' antennas, the horizontal beams and the vertical beams are combined as shown in FIG. 14. And, in the case of the '\' antennas, the horizontal beams and the vertical beams are combined as shown in FIG. 15.

Figure 16:
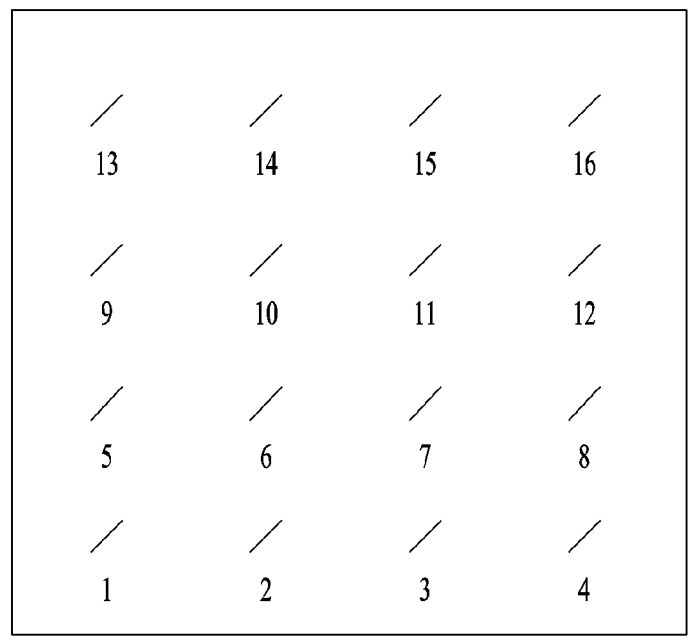
FIG. 16 and FIG. 17 are reference diagrams for explaining numbering of logical antenna ports.
Figure 17:
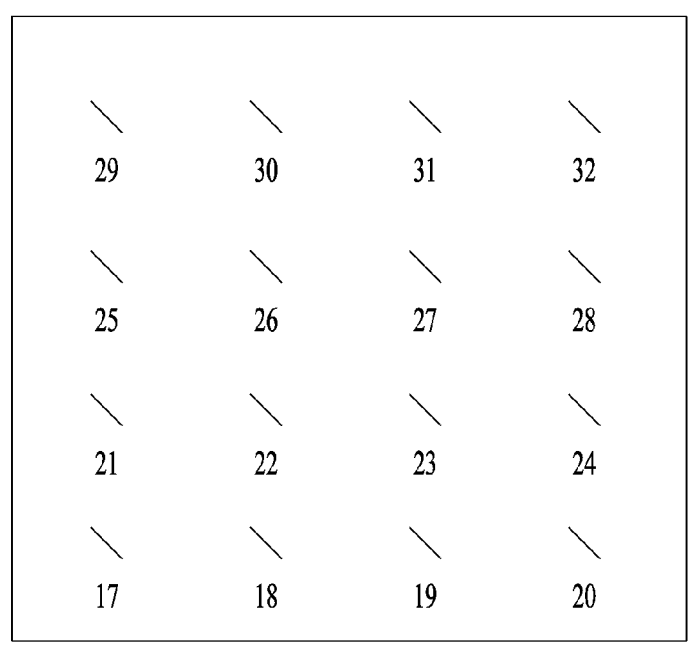

The base station may configure the CSI-RS in accordance with the logical antenna port and the UE obtains a channel established between the logical port and the UE through the configured CSI-RS. For convenience of description, assume that numbering for logical ports is performed as follows. It starts from the bottom left corner and numbers increase to the right. When it ends at the bottom right corner, it starts again from the left corner of the second bottom line and then it ends at the top right corner. In the case of the cross-pole antenna, numbering is first performed with respect to the '/' antenna of the two antennas arranged at the same position according to the above-mentioned rule. Subsequently, numbering is performed with respect to the remaining '\' antenna according to the above-mentioned rule. For instance, the logical antenna ports of FIG. 13 are numbered as shown in FIG. 16 and FIG. 17.

Thus, after estimating channel between the logical antenna port and the UE through the CSI-RS, the UE needs to select a proper short term PMI from a codebook for CSI feedback to the base station. In this case, it is assumed that the logical antenna port notified through the CSI-RS includes vertical logical antenna port $N_V$ and horizontal antenna port $N_H$. The present invention propose codebook design for cross-pole antennas.

A codebook for rank 1 according to the present invention can be represented in the form of Equation 19.

$$C_1 = \begin{bmatrix} W_V \otimes W_H \\ \alpha \times W_V \otimes W_H \end{bmatrix} \quad \text{[Equation 19]}$$

In Equation 19, $C_1$ means the rank 1 codebook, sets for $W_V$, $W_H$, and $\alpha$ are defined in Equations 20, 21, and 22, respectively.

$$W_V \in \{{}^V e_1, {}^V e_1, \ldots, {}^V e_{N_V}\} \qquad \text{[Equation 20]}$$

$$W_H \in \{{}^V e_1, {}^V e_1, \ldots, {}^V e_{N_H}\} \qquad \text{[Equation 21]}$$

$$\alpha \in \left\{1, \exp\left(j\frac{2\pi}{2^{N_\alpha}}\right), \exp\left(j\frac{4\pi}{2^{N_\alpha}}\right), \ldots, \exp\left(j\frac{2(2^{N_\alpha}-2)\pi}{2^{N_\alpha}}\right), \exp\left(j\frac{2(2^{N_\alpha}-1)\pi}{2^{N_\alpha}}\right)\right\} \qquad \text{[Equation 22]}$$

In Equation 20, $V_{e_i}$ indicates a vector with a size of $N_V$. In this vector, $i^{th}$ element is 1 and other elements are 0. In Equation 21, $H_{e_i}$ indicates a vector with a size of $N_H$. In this vector, $i^{th}$ element is 1 and other elements are 0. In Equation 22, $N_\alpha$ indicates a feedback bit number for the $\alpha$.

The $W_V$ and $W_H$ of the rank 1 codebook in Equation 19 are used for selecting appropriate beams from the vertical beams and the horizontal beams indicated through the CSI-RS, respectively. In addition, a phase difference between the '\' antenna and the '/' antenna can be adjusted through the $\alpha$. The final bit number of the codebook is $\lceil \log_2(N_V \times N_H) \rceil + N_\alpha$ (where $\lceil \ \rceil$ means a rounding up function). Here, values of the $N_V$ and $N_H$ are informed by the base station when the CSI-RS is configured. A value of the $N_\alpha$ may be predetermined between the transmitting and receiving ends or may be changed semi-statically through high layer signaling.

A codebook for rank 2 according to the present invention can be represented in the form of Equation 23.

$$C_2 = \begin{bmatrix} W_{V1} \otimes W_{H1} & W_{V2} \otimes W_{H2} \\ \beta \times W_{V1} \otimes W_{H1} & -\beta \times W_{V2} \otimes W_{H2} \end{bmatrix} \qquad \text{[Equation 23]}$$

In Equation 23, $C_2$ means the rank 2 codebook, $W_{V1}$ and $W_{V2}$ are selected from the same set as the $W_V$ in Equation 20. $W_{H1}$ and $W_{H2}$ are selected from the same set as the $W_H$ in Equation 21. $\beta$ is selected from the set in Equation 22.

$$\beta \in \left\{1, \exp\left(j\frac{2\pi}{2^{N_\beta}}\right), \exp\left(j\frac{4\pi}{2^{N_\beta}}\right), \ldots, \exp\left(j\frac{2(2^{N_\beta}-2)\pi}{2^{N_\beta}}\right), \exp\left(j\frac{2(2^{N_\beta}-1)\pi}{2^{N_\beta}}\right)\right\} \qquad \text{[Equation 24]}$$

In Formula 24, $N_\beta$ indicates a feedback bit number for the $\beta$. In the case of the rank 2 codebook in Equation 23, since the $W_{V1}$ and $W_{V2}$ are selected from the same set, the number of cases in which the same beam is selected for the $W_{V1}$ and $W_{V2}$ is $N_V$ and the number of cases in which different beams are selected is $N_V C_2$ (here ${}_aC_b$ means a combination b). If the order of the number of cases in which different beams are selected is changed, it may cause changes in columns of Equation 23. However, although the columns are changed, it can be considered as the same precoding, whereby the calculation can be performed using the combination. Similarly, since the $W_{H1}$ and $W_{H2}$ are selected from the same set in the case of the rank 2 codebook in Equation 23, the number of cases in which the same beam is selected for the $W_{H1}$ and $W_{H2}$ is $N_H$ and the number of cases in which different beams are selected is $N_H C_2$. If the order of the number of cases in which different beams are selected is changed, it may cause changes in columns of Equation 23. However, although the columns are changed, it can be considered as the same precoding, whereby the calculation can be performed using the combination as well.

In addition, the phase difference between the '\' antenna and the '/' antenna can be adjusted through the $\beta$. The final bit number of the codebook is $\lceil \log_2((N_V+{}_{N_V}C_2)(N_H+{}_{N_H}C_2)) \rceil + N_\beta$. Here, values of the $N_V$ and $N_H$ are informed by the base station when the CSI-RS is configured. A value of $N_\beta$ the may be predetermined between the transmitting and receiving ends or may be changed semi-statically through high layer signaling. In the final bit number, since a value of $\lceil \log_2((N_V+{}_{N_V}C_2)(N_H+{}_{N_H}C_2)) \rceil$ may be significantly increased depending on the values of the $N_V$ and $N_H$, subsets of the full set $\{W_{V1}, W_{V2}, W_{H1}, W_{H2}\}$ may be used by being predetermined in each combination of the $N_V$ and $N_H$ values or they may be used by being changed semi-statically through higher layer signaling.

Second Embodiment

Hereinafter, a method for a base station to use location information of a UE in order to obtain parameters with long-term characteristics according to the present invention will be described. The method can be used when the base station fails to receive, from the UE, feedback of values corresponding to the long-term parameters among values fed back by the UE.

According to the present invention, a serving cell and long-term CSI predefined according to a location can be used. Here, the long-term CSI may include an RI and a long-term PMI.

Figure 18:
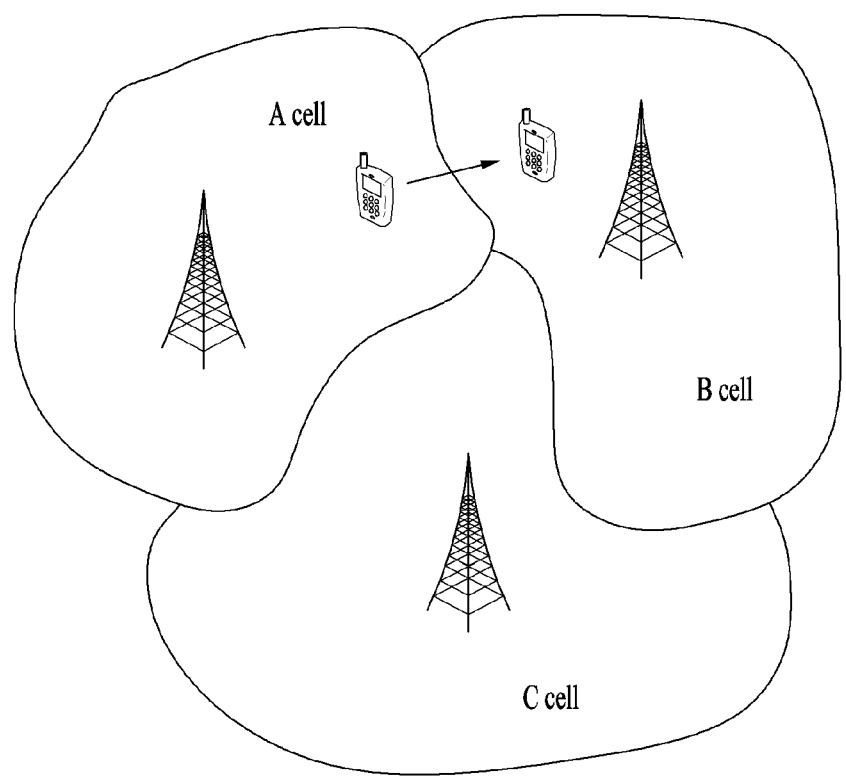
FIG. 18 illustrates cell coverages of three base stations according to one embodiment of the present invention.

FIG. 18 illustrates cell coverages of three base stations. It can be assumed that after the base stations are established, the base stations obtains information on such cell coverages based on RSRP values, which are measured at locations of the respective base stations. In addition, the base stations may periodically receive or calculate locations of UEs using i) a satellite, ii) a positioning RS or iii) an uplink RS. The base stations automatically perform a handover based on the location information of the UEs.

For example, in FIG. 18, a UE moves from cell coverage A to cell coverage B and a base station automatically performs a handover based on received location information. That is, even though the UE does not perform additional operations for a handover procedure, the base station can perform the handover of the UE using the received location information and the like.

Figure 19:
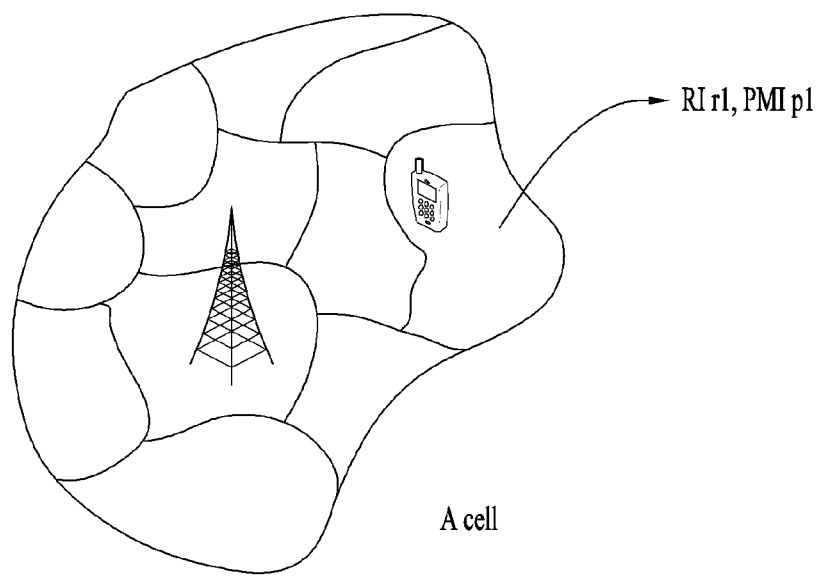
FIG. 19 illustrates a cell coverage of a specific cell among cell coverages of multiple cells.

FIG. 19 is a diagram illustrating a cell coverage of the cell A among cell coverages of multiple cells shown in FIG. 19 only. In FIG. 19, the cell coverage A is partitioned into 11 sub-coverages. The sub-coverages have different RI and long-term PMI values. It is assumed that the base station already knows the sub-coverages and RI and long-term PMI values suitable for the sub-coverages based on previously measured values.

In this case, since the UE is located in an area suitable for RI r1 and long-term PMI p1, the base station can assume the RI r1 and long-term PMI p1 for the corresponding UE. Thereafter, the base station can configure beams segmented towards p1 direction for the UE using a CSI-RS.

The cell coverages and the area for the RI and long-term PMI shown in FIG. 18 and FIG. 19 are measured in advance. In this case, such areas may be changed according to the number of UE's antennas and antenna characteristics. Thus, when measurement of these areas is performed, UE categories need to be created and the areas should be measured according to each category. Moreover, the base station may store a level (i.e., UE capability) in the category to which the UE belongs. Alternatively, the UE may inform the level in the category to which the corresponding UE belongs.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method of transmitting an enhance reference signal in a wireless communication system supporting multiple antennas and an apparatus therefor are described centering on examples applied to 3GPP LTE system, it may be applicable to various wireless communication systems as well as to the 3GPP LTE system.

What is claimed is:

1. A beamforming method in a wireless communication system supporting multiple antennas, the method performed by a base station and comprising:
determining a first coverage based on long-term feedback information;
configuring multiple logical antenna ports for the first coverage based on combinations of a plurality of horizontal beams and a plurality of vertical beams;
transmitting a channel state information-reference signal to a user equipment (UE) according to a precoding matrix index configured according to the configured multiple logical antenna ports; and
receiving short-term feedback information including a rank 1 codebook,
wherein the short-term feedback information is based on the channel state information-reference signal,
wherein each of the plurality of the horizontal beams correspond to one of a plurality of second coverages generated by dividing the determined first coverage into horizontal domains,
wherein each of the plurality of the vertical beams correspond to one of a plurality of third coverages generated by dividing the determined first coverage into vertical domains,
wherein the rank 1 codebook is defined based on a horizontal vector indicating a specific one of the plurality of horizontal beams, a vertical vector indicating a specific one of the plurality of vertical beams, and a phase correction parameter,
wherein the phase correction parameter is defined according to:

$$\alpha \in \left\{ 1, \exp\left(j\frac{2\pi}{2^{N_\alpha}}\right), \exp\left(j\frac{4\pi}{2^{N_\alpha}}\right), \ldots, \exp\left(j\frac{2(2^{N_\alpha}-2)\pi}{2^{N_\alpha}}\right), \exp\left(j\frac{2(2^{N_\alpha}-1)\pi}{2^{N_\alpha}}\right) \right\},$$

wherein $\alpha$ is a set of phase correction parameters, and
wherein $N_\alpha$ is a number of feedback bits for the phase correction parameter.

2. The method of claim 1, wherein the long-term feedback information comprises at least a rank indicator (RI) or a precoding matrix indicator (PMI).

3. The method of claim 1, wherein:
the configured multiple logical antenna ports are sequentially numbered with reference to the horizontal domains; and
the numbering is configured such that horizontal beams in a next horizontal domain are numbered when all horizontal beams in a specific horizontal domain are numbered.

4. The method of claim 1, wherein:
the multiple antennas correspond to cross-polarization antennas;
the configured multiple logical antenna ports comprise first logical antenna ports based on first polarization antennas and second logical antenna ports based on second polarization antennas; and the first logical antenna ports and the second logical antenna ports have a same corresponding weight vector.

5. The method of claim 1, wherein:
the rank 1 codebook is further defined according to:

$$C_1 = \begin{bmatrix} W_V \otimes W_H \\ \alpha \times W_V \otimes W_H \end{bmatrix}$$

$C_1$ is the rank 1 codebook;
$W_v$ is the vertical vector; and
$W_H$ is the horizontal vector.

6. The method of claim 1, wherein the long-term feedback information is determined based on a reference signal transmitted by the UE.

7. The method of claim 1, further comprising determining a handover based on a location of the UE according to a previously stored reference signal received power (RSRP).

8. The method of claim 1, wherein a number of rank 1 codebook bits is defined based on a number of vertical logical antenna ports, a number of horizontal logical antenna ports and $N_\alpha$.

9. The method of claim 8, wherein:
the number of rank 1 codebook bits is defined according to:

$$\lceil \log_2(N_V \times N_H) \rceil + N_\alpha;$$

$N_v$ is the number of vertical logical antenna ports; and
$N_H$ is the number of horizontal logical antenna ports.

10. A base station (BS) for performing beamforming in a wireless communication system supporting multiple antennas, the BS comprising:
a radio frequency (RF) unit configured to transmit and receive information; and
a processor configured to:
determine a first coverage based on long-term feedback information,
configure multiple logical antenna ports for the first coverage based on combinations of a plurality of horizontal beams and a plurality of vertical beams,
control the RF unit to transmit a channel state information-reference signal to a user equipment (UE) according to a precoding matrix index configured according to the configured multiple logical antenna ports; and
control the RF unit to receive short-term feedback information including a rank 1 codebook,
wherein the short-term feedback information is based on the channel state information-reference signal,
wherein each of the plurality of the horizontal beams correspond to one of a plurality of second coverages generated by dividing the determined first coverage into horizontal domains,
wherein each of the plurality of the vertical beams correspond to one of a plurality of third coverages generated by dividing the determined first coverage into vertical domains,
wherein the rank 1 codebook is defined based on a horizontal vector indicating a specific one of the plurality of horizontal beams, a vertical vector indicating a specific one of the plurality of vertical beams, and a phase correction parameter,
wherein the phase correction parameter is defined according to:

$$\alpha \in \left\{ 1, \exp\left(j\frac{2\pi}{2^{N_\alpha}}\right), \exp\left(j\frac{4\pi}{2^{N_\alpha}}\right), \ldots, \exp\left(j\frac{2(2^{N_\alpha}-2)\pi}{2^{N_\alpha}}\right), \exp\left(j\frac{2(2^{N_\alpha}-1)\pi}{2^{N_\alpha}}\right) \right\},$$

wherein $\alpha$ is a set of phase correction parameters, and
wherein $N_\alpha$ is a number of feedback bits for the phase correction parameter.

11. The BS of claim 10, wherein the long-term feedback information comprises at least a rank indicator (RI) or a precoding matrix indicator (PMI).

12. The BS of claim 10, wherein:
the configured multiple logical antenna ports are sequentially numbered with reference to the horizontal domains; and
the numbering is configured such that horizontal beams in a next horizontal domain are numbered when all horizontal beams in a specific horizontal domain are numbered.

13. The BS of claim 10, wherein:
the multiple antennas correspond to cross-polarization antennas;
the configured multiple logical antenna ports comprise first logical antenna ports based on first polarization antennas and second logical antenna ports based on second polarization antennas; and
the first logical antenna ports and the second logical antenna ports have a same corresponding weight vector.

14. The BS of claim 10, wherein:
the rank 1 codebook is further defined according to:

$$C_1 = \begin{bmatrix} W_V \otimes W_H \\ \alpha \times W_V \otimes W_H \end{bmatrix}$$

$C_1$ is the rank 1 codebook;
$W_v$ is the vertical vector; and
$W_H$ is the horizontal vector.

15. The BS of claim 10, wherein the long-term feedback information is determined based on a reference signal transmitted by the UE.

16. The BS of claim 10, wherein a number of rank 1 codebook bits is based on a number of vertical logical antenna ports, a number of horizontal logical antenna ports and $N_\alpha$.

17. The BS of claim 16, wherein:
the number of rank 1 codebook bits is further defined according to:

$$\lceil \log_2(N_V \times N_H) \rceil + N_\alpha$$

$N_v$ is the number of vertical logical antenna ports,
$N_H$ is the number of horizontal logical antenna ports.

* * * * *